United States Patent [19]
Urakawa et al.

[11] Patent Number: 5,699,180
[45] Date of Patent: Dec. 16, 1997

[54] LASER SCANNER WITH CURVED ANAMORPHIC MIRROR

[75] Inventors: Toshio Urakawa, Yamato-Koriyama; Hideki Goto, Osaka; Kounosuke Mino, Yamato-Koriyama, all of Japan

[73] Assignee: Sharp Kabushiki Kaisha, Osaka, Japan

[21] Appl. No.: 521,396

[22] Filed: Aug. 30, 1995

[30] Foreign Application Priority Data

Oct. 27, 1994 [JP] Japan ................... 6-263723

[51] Int. Cl.$^6$ ........................ G02B 26/08
[52] U.S. Cl. .............. 359/208; 359/205; 359/869; 347/257; 347/260
[58] Field of Search ............... 359/196, 205, 359/207, 208, 867, 868, 869; 347/256, 257, 260; 372/108

[56] References Cited

U.S. PATENT DOCUMENTS

| | | | |
|---|---|---|---|
| 4,759,593 | 7/1988 | Kessler | 359/208 |
| 4,918,702 | 4/1990 | Kimura | 372/108 |
| 5,038,156 | 8/1991 | Kuroda et al. | 347/259 |
| 5,233,454 | 8/1993 | Sakuma et al. | 359/196 |
| 5,301,060 | 4/1994 | Niikawa et al. | 359/869 |
| 5,373,390 | 12/1994 | Sakoma | 359/196 |
| 5,381,438 | 1/1995 | Guo et al. | 372/108 |

FOREIGN PATENT DOCUMENTS

| | | |
|---|---|---|
| 32 06 819 A1 | 9/1982 | European Pat. Off. . |
| 42 13 556 C2 | 10/1993 | Germany . |
| 54-123 040 | 9/1979 | Japan . |
| 57-2223 | 1/1982 | Japan . |
| 1-200219 | 8/1989 | Japan . |
| 1-200220 | 8/1989 | Japan . |
| 5-53067 | 3/1993 | Japan .......... 359/205 |

OTHER PUBLICATIONS

Naumann/Schröder, *Bauelemente Der Optik, Taschenbuch der technischen Optik* [Optical Components, a Handbook of Optical Technology], 5th Edition, Munich, Hanser Verlag (1987), pp. 267–273.

Patent Abstracts of Japan, vol. 17, No. 566, P-1629, Oct. 14, 1993, abstracting Japanese unexamined application JP 5-164 981-A, Atsumi/Ricoh Co. Ltd., published 29 Jun. 1993.

*Primary Examiner*—Paul M. Dzierzynski
*Assistant Examiner*—Darren E. Schuberg
*Attorney, Agent, or Firm*—David G. Conlin; Milton Oliver

[57] ABSTRACT

A laser beam is projected from a laser oscillator 1 and converged by a condenser lens 2. The laser beam converged by the condenser lens 2 is reflected in any arbitrary direction by a scanning mirror 4 which is rotated by scanning means 3. The laser beam is linearly moved. The laser beam is reflected by a curved surface reflecting mirror 5 which is formed in a spherical surface in the primary scanning direction of the laser beam and an ellipsoid in the secondary scanning direction so that the scanned surface is scanned at a substantially predetermined speed.

8 Claims, 16 Drawing Sheets

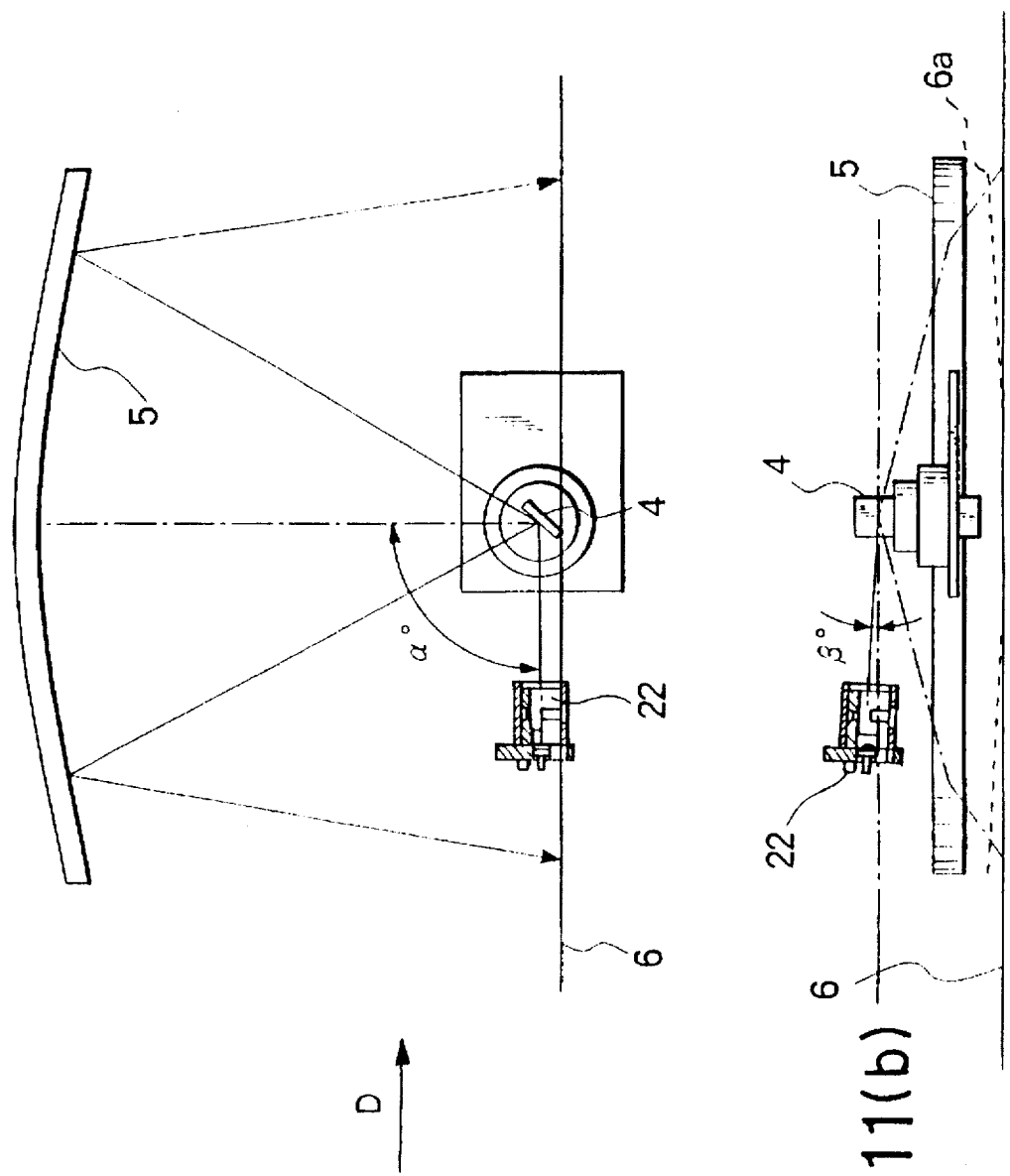
FIG. 11(a)
FIG. 11(b)
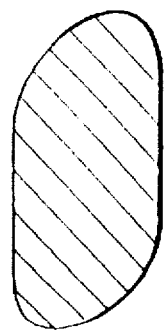
FIG. 12

LASER SCANNER WITH CURVED ANAMORPHIC MIRROR

BACKGROUND OF THE INVENTION

1. Field of the Invention

The present invention relates to a laser scanner linearly scanning an object with a laser beam, and, more particularly, to a laser scanner used for a laser bar code reader, a laser printer, laser fax or a laser OCR.

2. Description of the Related Art

In a laser scanner, a laser beam is generally reflected by a rotating or reciprocating scanning mirror, and the reflected beam becomes a linearly scanning beam. To scan a given plane with a focused laser beam with a predetermined speed, a lens or another mirror is disposed between the plane and the mirror to cause the laser beam to pass through the lens or to be reflected by the other mirror so that its direction or focal point is changed.

Various structures for the lens or mirror have been proposed. For example, a system consisting of only mirrors and a one using a mirror with a curved reflecting surface are disclosed in Japanese Patent Application Laying Open (KOKAI) No. 1-200219, Japanese Patent Application Laying Open (KOKAI) No. 1-200220, and Japanese Patent Publication (KOKOKU) No. 57-2223. These publications propose a laser scanner using a spherical mirror.

A laser beam scanner comprises, as shown in FIG. 16, a laser oscillator 1 for projecting a laser beam, a condenser lens 2 for condensing the laser beam projected from the laser oscillator 1, a single surface mirror 4 for reflecting the laser beam condensed by the condenser lens 2 to a desired direction, a lens 30 for imaging the laser beam reflected by the single surface mirror 4 on a scanning position, a light receiving element 7 for sensing the position of the scanning beam and positioned just before the scanning position in a scanning area, and a reflecting mirror 14 for directing the laser beam to the light receiving element 7.

A lens frame, which fastens the condenser lens 2, is made of aluminum or brass, while a lens holder is made of aluminum, FRP, or the like. The single surface mirror 4 is formed by mirror finishing only one surface of a polygon mirror and roughening the other surface for irregular reflection, or painting them. Alternately, it is formed by mirror finishing one surface and painting the other surface in black.

A conventional laser scanner which uses a scanning mirror having a plurality of mirror surfaces is necessary to correct shifting of the scanning position because of variation in angles between a plurality of mirror surfaces so that it requires a plurality of lenses and mirrors in addition to the scanning mirror and the condenser or collimator lens for implementing a function for making the scanning speed constant, a function for correcting a focal point position, and a function for correcting the shifting of the scanning position, thereby increasing the number of components and cost.

In addition, it is presently typical to use a laser diode as the laser oscillator 1. The laser diode 1 has, as shown in FIG. 17, an astigmatic difference in which the starting points of a beam in the direction Y along the chip layer and the direction X normal to that differ by a distance Z1. When it is focused by a cylindrical lens, there arises a difference Z2 in the focal distance. Assuming that the scanning point is P1, the beam is converged in the direction X normal to the chip layer, but not in the direction Y along the chip layer. Thus, there arises such a problem that the beam cannot be converged in a suitable diameter when it is intended to obtain a laser scanner with high precision.

Furthermore, a laser position detection element should be generally positioned at a location where the optical path length of the laser to the element substantially equals to the distance to the laser scanning position, thereby causing restriction in the structure or increasing the optical path length. This makes it necessary to provide a reflecting mirror in the optical path to redirect the optical path so that there arises a problem of increase of the scanner size or the number of components.

In addition, if temperature changes during use, the distance between the laser oscillator and the condenser lens varies due to expansion or contraction of mounting members for them. Such change causes a problem in a magnifying optical system such that, if the optical power is high, the focal point of the laser beam is shifted to significantly vary the shape of laser beam on the scanning position. Moreover, there is a problem that it is necessary to provide a slit with a separate member on the front end of the condenser lens frame or the lens holder thereby increasing the product cost.

SUMMARY OF THE INVENTION

The present invention is intended to provide a laser scanner for which the number of components can be reduced thereby reducing the cost, and in which shifting of the focal point caused by an astigmatic difference can be reduced.

According to the present invention, the above object can be attained by a laser scanner comprising a laser emitting unit composed of laser oscillating means for projecting a laser beam, and condenser lens means for condensing the laser beam projected from the laser oscillating means; laser scanning means including a scanning mirror for moving linearly the laser beam condensed by the condenser lens means in the primary scanning direction; curved surface reflecting mirror means for reflecting the moved laser beam; and a photosensitive body for receiving the laser beam reflected by the curved surface reflecting mirror, wherein the curved surface reflecting mirror has a spherical surface in the primary scanning direction of the laser beam and an ellipsoid in the secondary scanning direction which is perpendicular to the primary scanning direction, so that the laser beam travels at a substantially constant speed on the scanned surface of the photosensitive body.

According to the laser scanner described above, the laser beam is projected by the laser oscillating means, the condenser lens means condensing the laser beam projected from the laser oscillating means, the scanning mirror which is rotated by the scanning means reflecting the laser beam condensed by the condenser lens means in a desired direction, the laser beam being scanned in the primary scanning direction, the curved surface reflecting mirror which is spherical in the primary scanning direction of the laser and elliptical in the secondary scanning direction reflecting the scanned laser beam to scan the surface of the photosensitive body to be scanned at a substantially constant speed. This eliminates the mechanism for correcting an error in the position of beam after reflection caused by variation in parallelism between the surfaces as in using a scanning mirror with a plurality of surfaces. A single curved surface mirror means with an aspheric surface can serve as both of the mechanisms for making the scanning speed uniform and for correcting the shifting of focal point. In addition, when a laser diode is used as the laser oscillating means, if a mirror with spherical surface is employed, the position of focal point is shifted between the primary and secondary scanning directions due to the astigmatic difference. Such shifting of focal point can be reduced by forming the curved surface of mirror in a part of circle in the primary scanning direction and in a part of ellipse in the secondary scanning direction.

The laser scanner may comprise laser oscillating means holding means for holding the laser oscillating means; a condenser lens frame for holding the condenser lens means; lens holding means made of a material selected from materials with a coefficient of linear expansion larger than that of the condenser lens frame and for holding the condenser lens frame slidably in the axial direction; and an adhesive injection port formed in the lens holding means at the side not contacting the laser oscillating means holding means, wherein the position of the condenser lens frame is determined, and the condenser lens frame is fixed on the lens holding means by injecting adhesives through the injection port.

With such arrangement, the laser oscillating means is held by the laser oscillating means holding means, the condenser lens means being held by the condenser lens frame, the condenser lens frame being held slidably in the axial direction by the lens holding means made of a material selected from materials with a coefficient of linear expansion larger than that of the condenser lens frame, the adhesive injection port being formed in the lens holding means at the side not contacting the laser oscillating means holding means, the position of the condenser lens frame being determined, adhesives being injected through the injection port to fix the condenser lens frame on the lens holding means. Thus, even if the condenser lens frame and the lens holding means are expanded because of temperature change, the variation of the distance between the laser oscillating means and the condenser lens frame can be maintained at the minimum because the coefficient of linear expansion of the lens holding means is larger than that of the condenser lens frame.

In addition, the scanning mirror may be made of a rectangular glass plate one surface of which is mirror finished, and the other surface of which is finished to make irregular reflection. With such approach, the laser beam is reflected onto the curved surface reflecting mirror means by the scanning mirror. Thus, manufacturing of the scanning mirror becomes facilitated.

Furthermore, a reflecting surface with curvature different from that in the effective scanning area of the curved surface reflecting mirror means may be formed outside the effective scanning area integrally adjacent to the reflecting mirror means. This allows it to eliminate a special mirror for reflecting the laser beam onto the light receiving element so that the number of components can be reduced.

Still further, the curved surface reflecting mirror means may be molded of resin. This simplifies its manufacture.

Still further, the distance from the scanning mirror to the curved surface reflecting mirror means may be arranged to be substantially equal to the distance from the curved surface mirror means to the scanning line so that the incident angle of the laser beam on the scanning mirror is made substantially normal to the center of scanning in the primary scanning direction, and substantially equal to the incident angle of the laser beam onto the curved surface reflecting mirror from the direction normal to the secondary scanning direction. This allows it to maintain the focal point error in the primary and secondary scanning directions at the minimum so that the linearity error and the focal point position error can be maintained at a sufficiently practical level.

Still further, the laser oscillator may be constituted by a laser diode the orientation of the chip layer of which is inclined at an angle substantially equal to the incident angle on the scanning mirror in the secondary scanning direction. Although the scanning direction of the laser beam reflected from the scanning mirror may be out of coincidence with the laser beam normal to the chip layer orientation of the laser diode to cause distortion, the scanning direction of the laser beam reflected from the scanning mirror may be made substantially coincidence with the direction of the laser beam normal to the orientation of the chip layer of the laser diode if the orientation of the chip layer of the laser diode is inclined at an angle substantially equal to that of the secondary scanning direction.

According to another aspect of the present invention, there is provided a laser scanner comprising a laser emitting unit consisting of laser oscillating means for projecting a laser beam, and condenser lens means for condensing the laser beam projected from the laser oscillating means; laser scanning means including a scanning mirror for moving linearly the laser beam condensed by the condenser lens means in the primary scanning direction; curved surface reflecting mirror means for reflecting the moved laser beam; a photosensitive body for receiving the laser beam reflected by the curved surface reflecting mirror; laser oscillating means holding means for holding the laser oscillating means; a condenser lens frame for holding the condenser lens means; lens holding means made of a material selected from materials with a coefficient of linear expansion larger than that of the condenser lens frame and for holding the condenser lens frame slidably in the axial direction; and an adhesive injection port formed in the lens holding means at the side not contacting the laser oscillating means holding means, wherein the curved surface reflecting mirror has a spherical surface in the primary scanning direction of the laser beam and an ellipsoid in the secondary scanning direction, having a reflecting surface formed outside the effective scanning region with the different curvature than that in the region, the laser beam being moved at a substantially constant speed on the scanned surface of the photosensitive body, the position of the condenser lens frame being determined, the condenser lens frame being fixed on the lens holding means by injecting adhesives through the injection port.

According to the laser scanner described above, the laser beam is projected by the laser oscillating means, the condenser lens means condensing the laser beam projected from the laser oscillating means, the scanning mirror which is rotated by the scanning means reflecting the laser beam condensed by the condenser lens means in a desired direction, the laser beam being scanned in the primary scanning direction, the curved surface reflecting mirror which is spherical in the primary scanning direction of the laser and ellipse in the secondary scanning direction reflecting the scanned laser beam to scan the surface of the photosensitive body to be scanned at a substantially constant speed. This eliminates the mechanism for correcting an error in the position of beam after reflection caused by variation in parallelism between the surfaces as in using a scanning mirror with a plurality of surfaces. Only one curved surface mirror means with an aspheric surface can serve as the mechanisms for making the scanning speed uniform and for correcting the shifting of focal point. In addition, when a laser diode is used as the laser oscillating means, if a mirror with spherical surface is employed, the position of focal point is shifted between the primary and secondary scanning directions due to the astigmatic difference. Such shifting of focal point can be reduced by forming the curved surface of mirror in a part of circle in the primary scanning direction and in a part of ellipse in the secondary scanning direction. Furthermore, the laser oscillating means is held by the laser oscillating means holding means, the condenser lens means being held by the condenser lens frame, the condenser lens frame being held slidably in the axial direction by the lens holding means made of a material selected from materials with a coefficient of linear expansion larger than that of the condenser lens frame, the adhesive injection port being formed in the lens holding means at the side not contacting the laser oscillating means holding means, the position of the condenser lens frame being determined, adhesives being injected through the injection port to fix the condenser lens frame on the lens holding means. Thus, even if the condenser lens frame and the lens holding means are expanded because of temperature change, the variation of the distance between the laser oscillating means and the condenser lens frame can be maintained at the minimum because the coefficient of linear expansion of the lens holding means is larger than that of the condenser lens frame. Moreover, a reflecting surface with curvature different from that in the effective scanning area of the curved surface reflecting mirror means is formed outside the effective scanning area integrally adjacent to the reflecting mirror means. This allows it to eliminate a special mirror for reflecting the laser beam onto the light receiving element.

With the arrangement described above, the light receiving element may be disposed on the reflected optical path of the laser beam projected on the reflecting surface of the curved surface reflecting mirror means. This enables the light receiving element to detect a reference position of the laser beam.

In addition, the laser beam reflected on the reflecting surface of the curved surface reflecting mirror means may be arranged to be focused near the light receiving element. This enables it to accurately detect the reference position.

Furthermore, a slit with a rectangular opening may be integrally formed on the laser projecting port of the condenser lens frame. This allows it to reduce the number of components, and thus to reduce the cost.

Still further, the laser beam projected from the laser diode and passing through the condenser lens which converges such laser beam may be convergent. This provides convergence for the laser beam after passing through the condenser lens so that the degree of freedom is enhanced in the design.

Further objects and advantages of the present invention will be apparent from the following description of the preferred embodiments of the invention as illustrated in the accompanying drawings.

BRIEF DESCRIPTION OF THE DRAWINGS

FIG. 11 is a diagram for illustrating operation of the present invention;

FIG. 12 is the shape of a beam;

DESCRIPTION OF THE PREFERRED EMBODIMENTS

Now, a first embodiment of a laser scanner according to the present invention is described with reference to the drawings. The laser scanner is applied to a laser printer.

Figure 1:
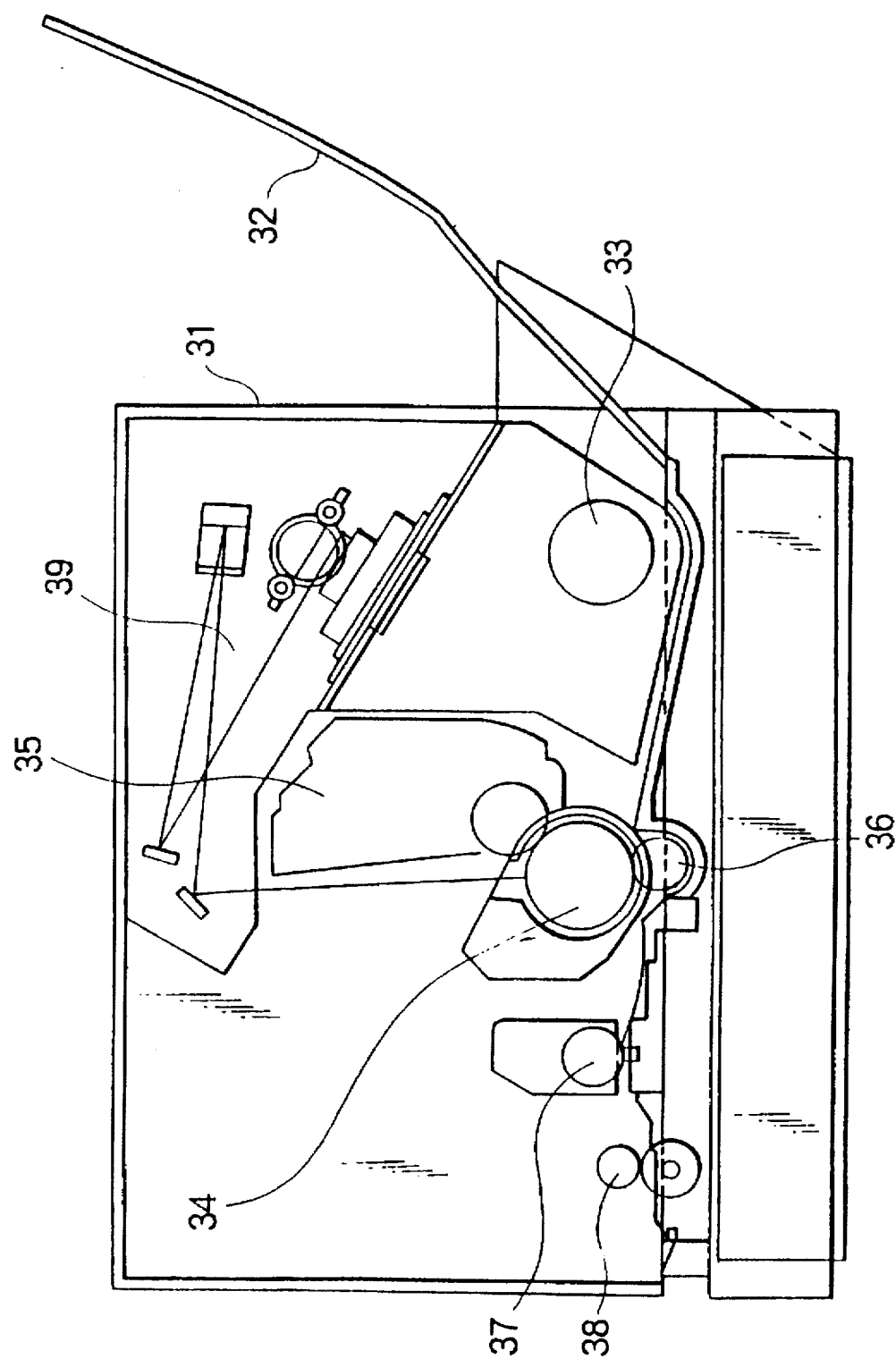
FIG. 1 is a schematic diagram showing the arrangement of a laser printer according to an embodiment of the present invention.

Referring to FIG. 1, the laser printer of this embodiment has a sheet feeder 32 at the right side of the body 31 on which sheets of paper is stacked. A pickup roller 33 is disposed in the body 31 in the downstream to the sheet feeding direction from the sheet feeder 32 for feeding the sheets of paper stacked on the sheet feeder 32 one after another. Positioned in the downstream to the sheet feeding direction from the pickup roller 33 is a photosensitive body 34 for forming an electronic latent image based on the projected laser beam. Disposed around the photosensitive body 34 are a developer 35 for developing the electronic latent image with toner, a transfer unit 36 for transferring the developed toner image on the sheet of paper being fed, primary and secondary charging units, a cleaner (these being not shown). In addition, disposed in the downstream to the photosensitive body 34 in the sheet feeding direction is a fixing unit 37 for thermally fixing the toner image transferred from the transfer unit 36. Disposed in the downstream to the fixing unit 37 in the sheet feeding direction is a discharge roller 38 for discharging the printed sheet from the body 31. A laser scanner 39 generating a laser beam is also disposed in the body 31.

Figure 2:
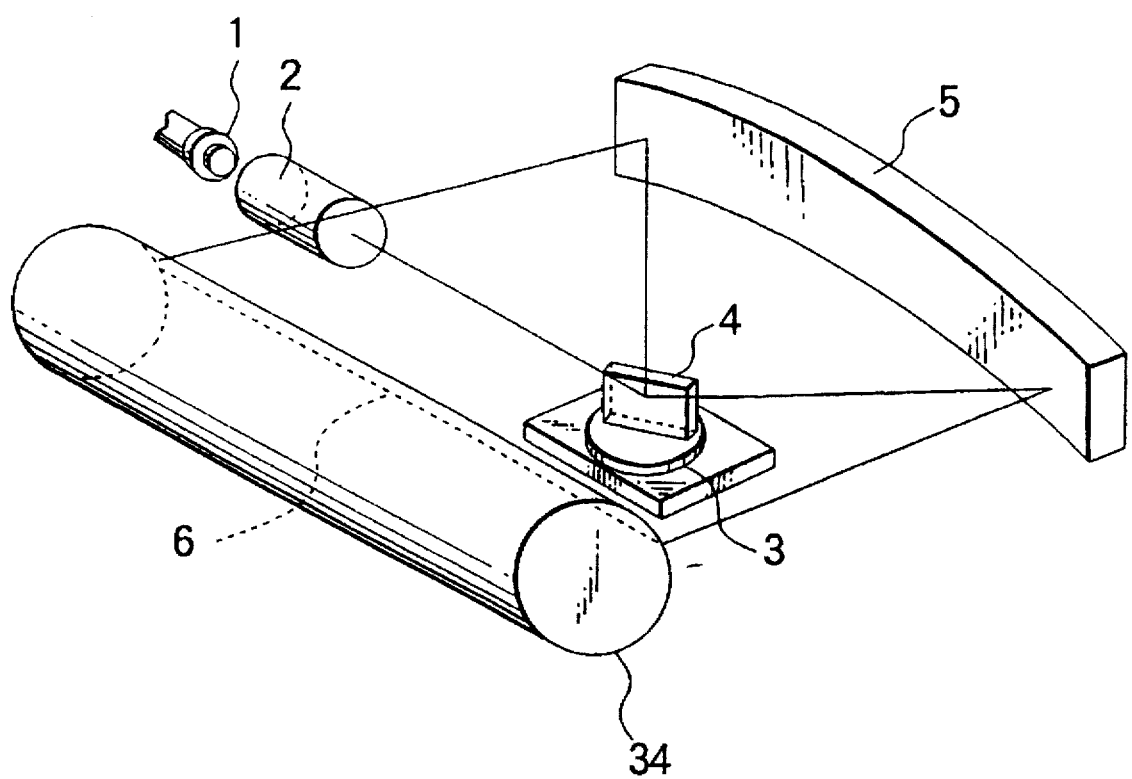
FIG. 2 is a schematic diagram showing the arrangement of a laser scanner according to an embodiment of the present invention.
Figure 3:
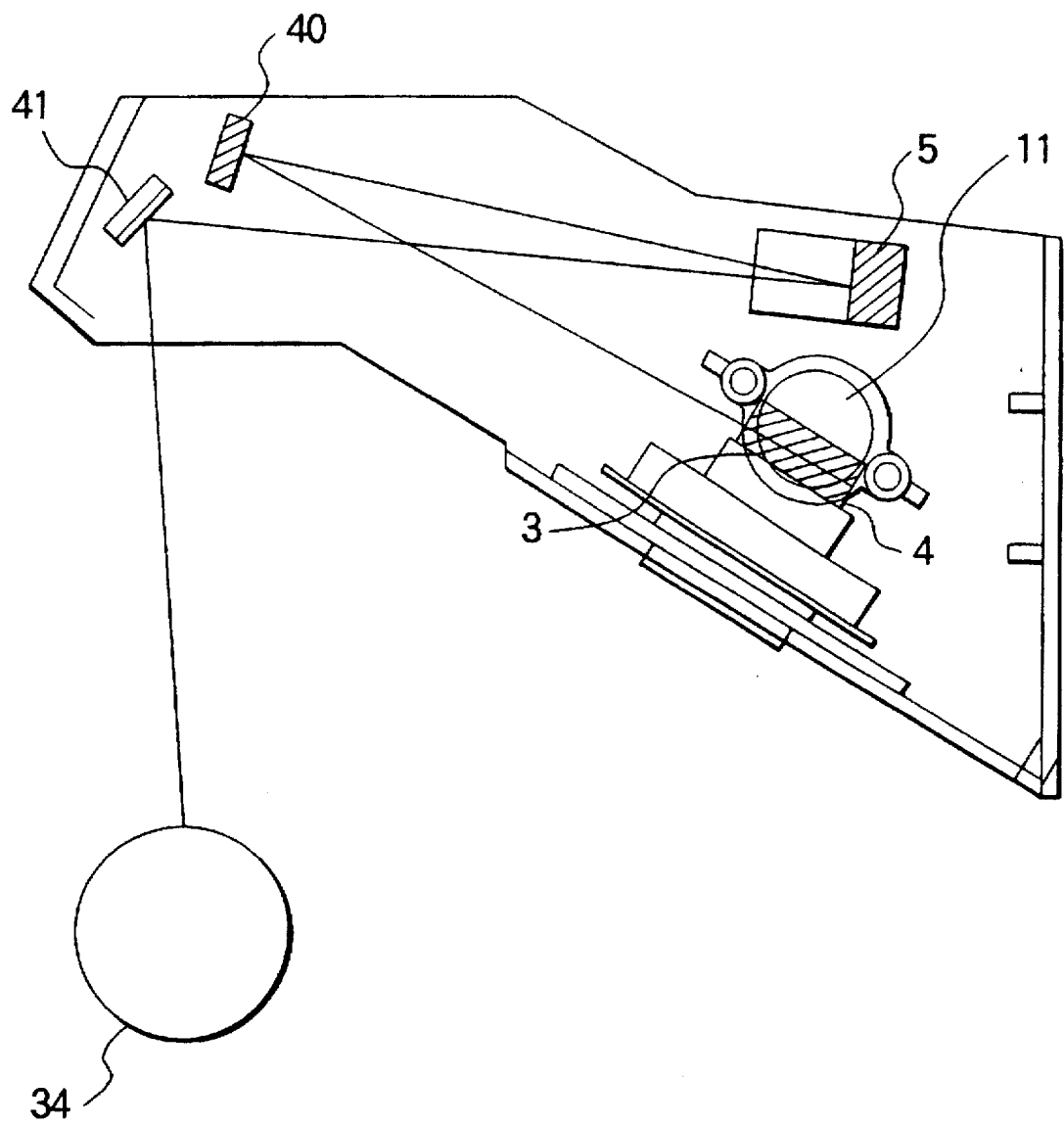
FIG. 3 is a schematic diagram showing the arrangement of a laser scanner according to an embodiment of the present invention.

The laser scanner 39 comprises, as shown in FIGS. 2 and 3 in detail, a laser oscillator 1 as laser oscillator means for projecting a laser beam, a condenser lens 2 as condenser lens means for condensing the laser beam projected from the laser oscillator 1, a scanning mirror 4 for reflecting the laser beam condensed by the condenser lens 2 in an arbitrary direction, scanning means 3 for rotating the scanning mirror 4 so that the laser beam is linearly scanned in the primary scanning direction, a curved surface mirror 5 as curved surface reflecting mirror means for reflecting the scanned laser beam so that the scanned surface 6 on the photosensitive body 34 is scanned at a substantially predetermined speed. References 40 and 41 in FIG. 3 denote redirection mirrors which are omitted from FIG. 2. If the rotation shaft of a scanning motor which is a component of the scanning means 3 is inclined, there may arise the same problem as in the variation in angles between the mirror surfaces. Thus, a motor having motor bearings with a long span is used to prevent inclination of the shaft.

Figure 4:
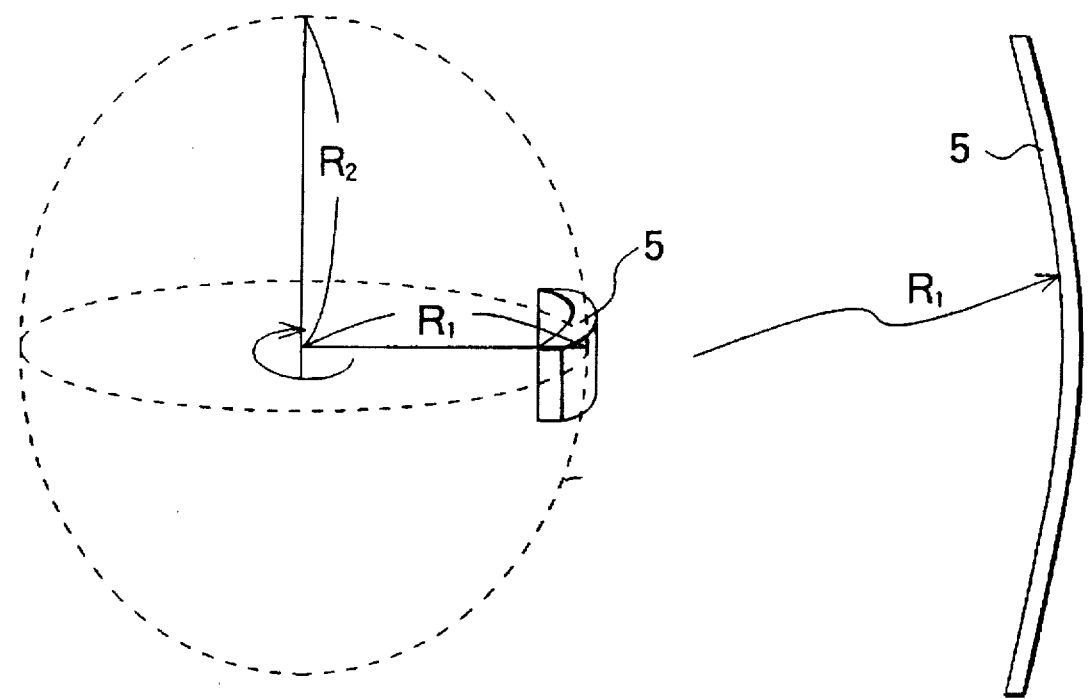
FIG. 4 is a curved surface reflecting mirror of a laser scanner according to an embodiment of the present invention.

The curved surface mirror 5 is formed, as shown in FIG. 4 in detail, to have a spherical surface with a radius R1 in the primary scanning direction of the laser, and an ellipsoid with a major axis length R2 and a miner axis width R1 in the secondary scanning direction. Various directions can be attained in the primary and secondary scanning directions by changing the curvature and the ellipcity.

Figure 5:
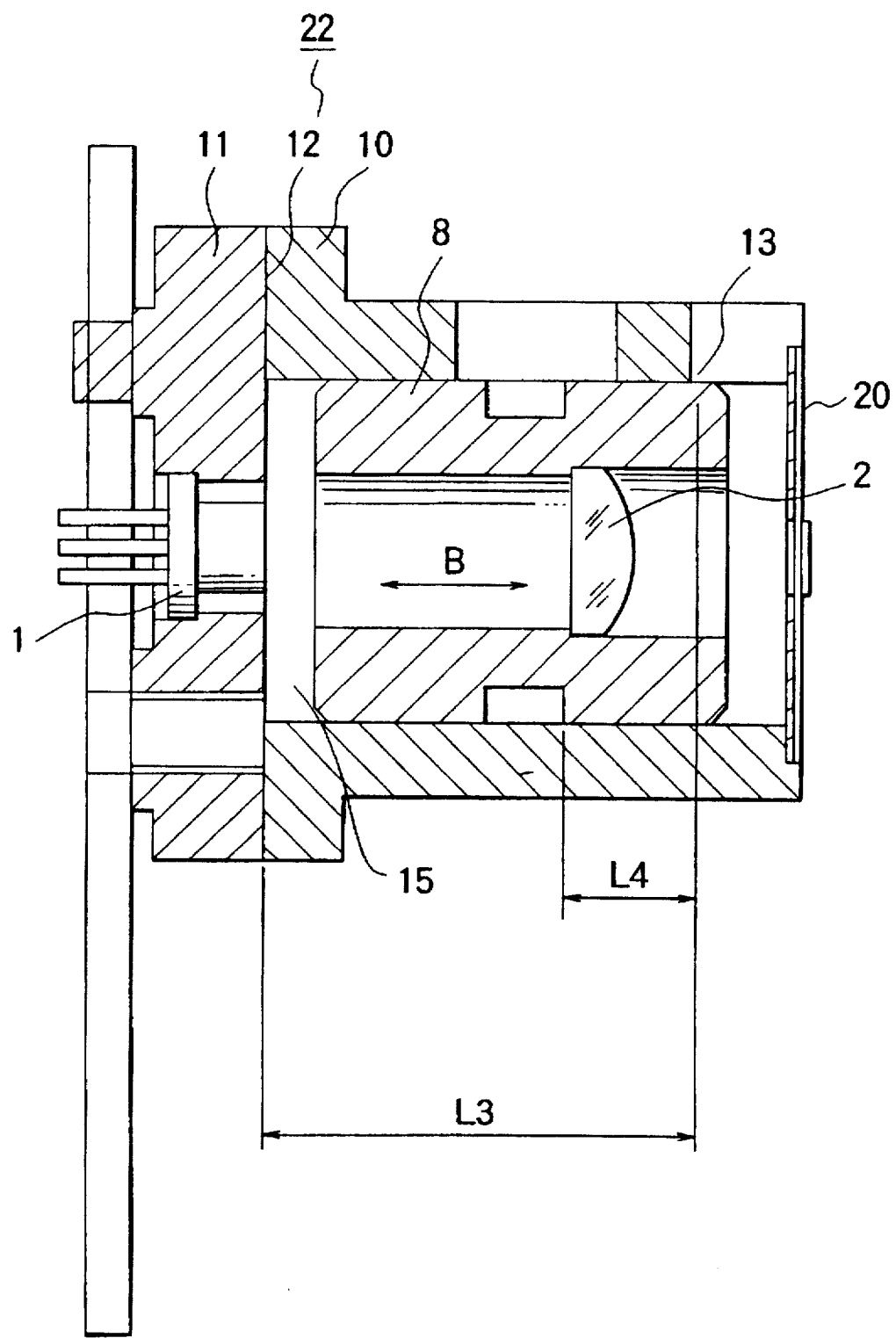
FIG. 5 is a laser emitting unit for a laser scanner according to an embodiment of the present invention.

The laser diode 1 is fixed, as shown in FIG. 5, on a laser holder 11 as laser oscillating means holding means with ultraviolet curing adhesives, while the condenser lens 2 is fixed on a condenser lens frame 8 with the ultraviolet curing adhesives. The lens frame 8 is then fixed on a lens holder 11 and held by a lens holder 10 as lens holding means for slidably holding the condenser lens frame 8 in the axial direction B. The lens holder 10 is made of a material selected from materials with a coefficient of linear expansion larger than that of the condenser lens frame 8. For example, used for the condenser lens frame 8 is aluminum with the coefficient of linear expansion of about $2 \times 10^{-5}/°$ C., while iron with the coefficient of linear expansion of about $1 \times 10^{-5}/°$ C. is used for the lens holder 10. The lens holder 10 is fixed with screws to contact the lens holder 11 with the surface 12. An adhesive injection port 13 is opened in the lens holder 10 on the side not contacting the laser oscillator 1. After the condenser lens frame 8 is positioned, the ultraviolet curing adhesives is injected through the injection port 13 to fix the condenser lens frame 8 on the lens holder 10. A slit 20 is attached on the front end of the lens holder 10 to regulate the shape of the beam spot. These components constitute the laser emitting unit 22.

The scanning mirror 4 is mirror finished with aluminum metallization on one surface, while the other surface is finished in ground glass to make irregular reflection. Although there is a process to black paint the non-mirror surface, the ground glass finish is advantageous in the manufacturing process in view of cost. Because the scanning mirror 4 is aluminum metallized, laminated with a protective layer, and ground glass finished in a large sheet of plate glass, and then cut into rectangles, it is more advantageous in cost than mirror finishing aluminum after cutting it with a dedicated machine.

Figure 6:
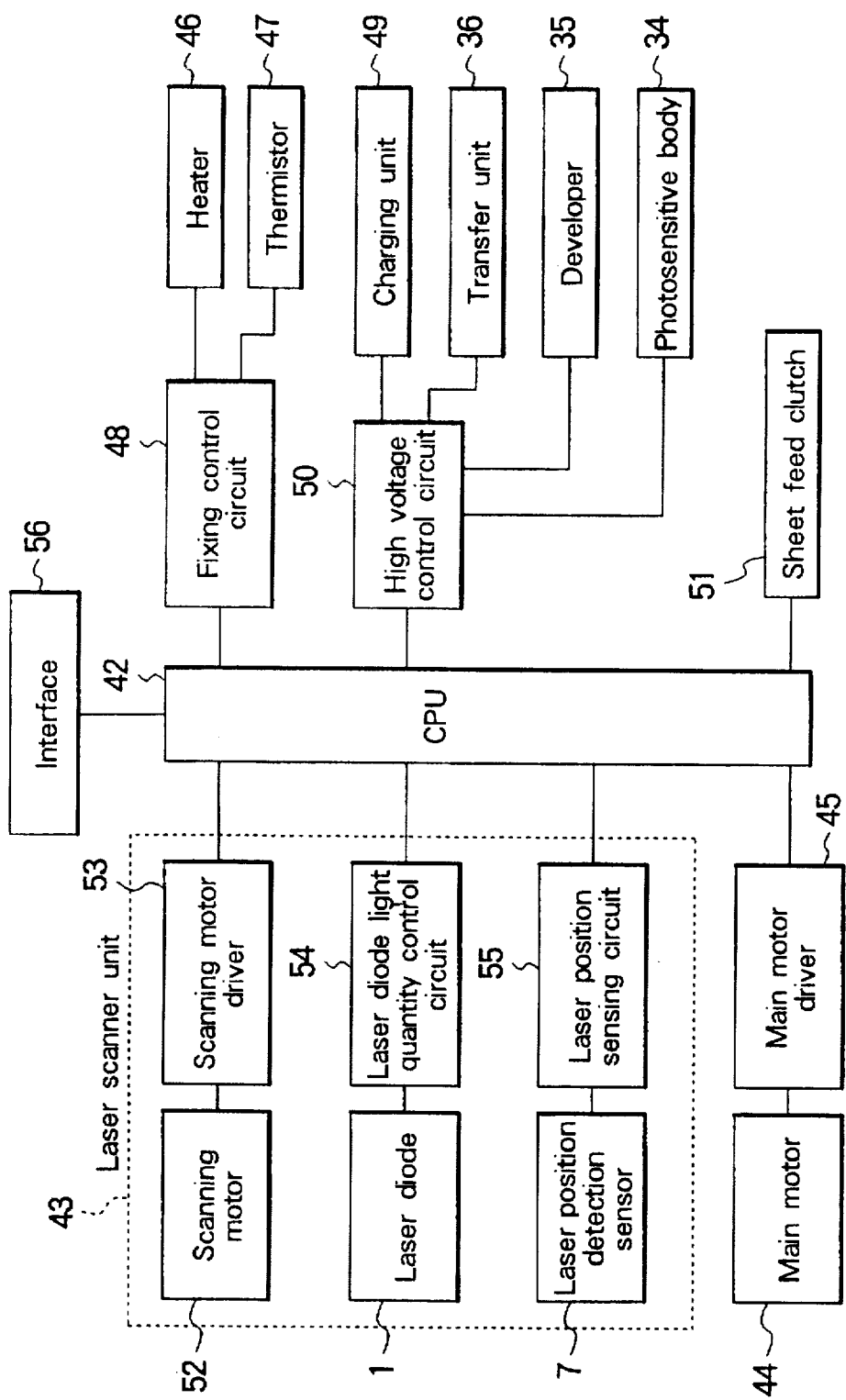
FIG. 6 is a block diagram showing a control system for a laser printer according to the present invention.

The laser printer has a CPU 42 for controlling each section as shown in FIG. 6. The CPU 42 is connected to a laser scanner unit 43, a main motor driver 45 for controlling a main motor 44 as the power source, a fixing control circuit 48 for controlling a heater 46, which heats a fixing unit 37, and a thermistor 47, which detects the temperature of the fixing unit 37, a high voltage control circuit 50 for controlling a charging unit 49, a transfer unit 36, a developing unit 35 and a photosensitive body 34, a sheet feed clutch 51 for turning on or off driving of a pickup roller 33, and an interface 56 being connected with an external device. The laser scanner unit 43 consists of a scanning motor driver 53 for controlling driving of a scanning motor 52, which is a component of the scanning means 3, a laser diode light quantity control circuit 54 for controlling the quantity of light of the laser diode 1, and a laser position sensing circuit 55 for detecting the reference position of the laser beam based on a signal from a light receiving element 7 for detecting position.

The operation of the embodiment is described in the following.

The sheets of paper stacked on the sheet feeder 32 are fed one after another by the pickup roller 33. An electrostatic latent image is drawn on the photosensitive body 34, which has been uniformly charged by the charging unit 49, with the laser beam projected from the laser scanner 39. The electrostatic latent image drawn on the photosensitive body 34 is developed to a toner image by the developing unit 35. The developed toner image is then transferred by the transfer unit 36 to the sheet of paper being fed. The developed toner image on the sheet of paper is thermally fixed by the fixing unit 37. The fixed sheet of paper is discharged outside the device body 31 by the discharge roller 38.

Figure 7:
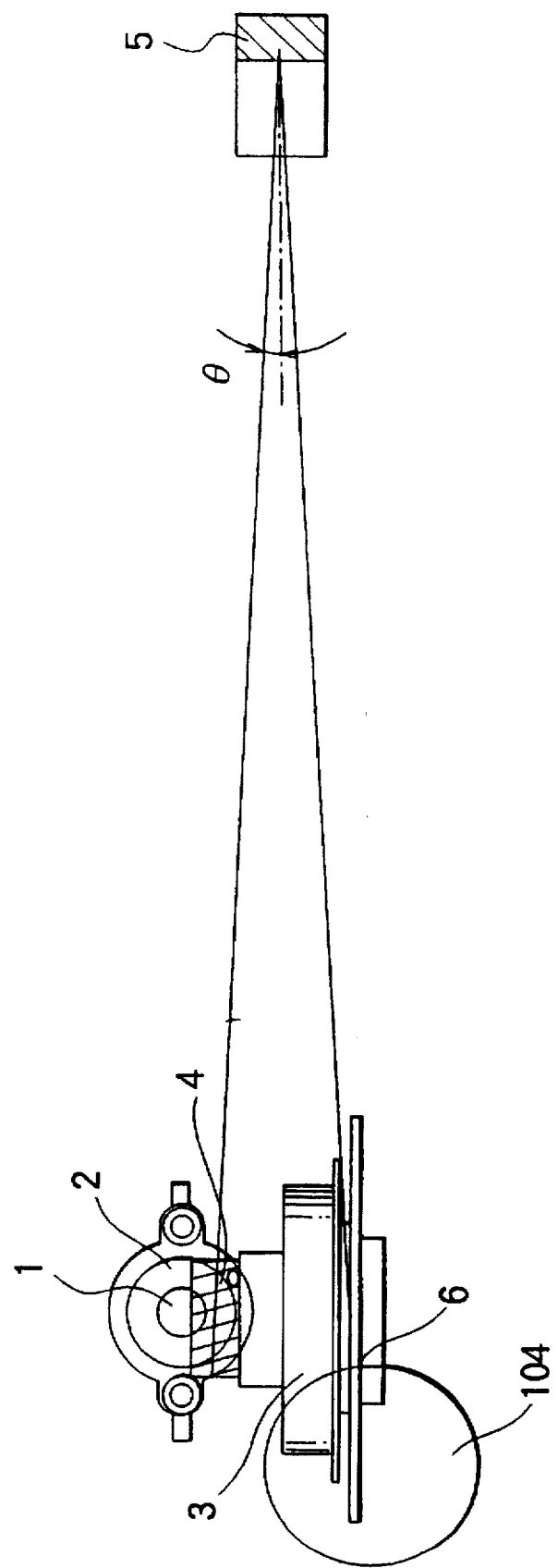
FIG. 7 is a diagram for illustrating operation of the present invention.

Now, the operation of the laser scanner 39 is described with reference to FIGS. 2 and 7.

The laser beam projected from the laser diode 1 is incident on the condenser lens 2 and converged by it. The laser beam converged by the condenser lens 2 is turned into a convergent beam with a limited focal point and is incident on the scanning mirror 4 having one laser reflecting surface and rotated by the scanning means 3 at a predetermined number of rotations. The laser beam reflected by the scanning mirror 4 is turned into a scanning beam with which one plane is scanned. The scanning beam is incident on the curved surface reflecting mirror 5 having a curved laser reflecting surface. The laser bean reflected from the curved surface reflecting mirror 5 reaches a laser beam scanning line 6 on the photosensitive body 34 to scan the latter.

Generally, the laser diode 1 has an astigmatic difference where the laser projecting point differs in the direction along the chip layer and the direction normal thereto. It has been observed that a laser beam converged by an optical system consisting of spherical components has different focal point positions in the direction along the chip layer and the direction normal thereto. For example, if an astigmatic difference is 10 μm, and the optical system has a convergence scale factor of 30, then the shifting of focal point becomes 9 mm. Thus, the embodiment reduces the shifting of focal point by forming the curved surface of the mirror 5 with different curvature in the scanning direction and in the direction normal thereto. Accordingly, it can be determined that the curved surface reflecting mirror 5 has a capability to focus the focal point on the scanning line 6, and a capability to make constant the scanning speed of laser beam on the scanning line 6.

Figure 8A:
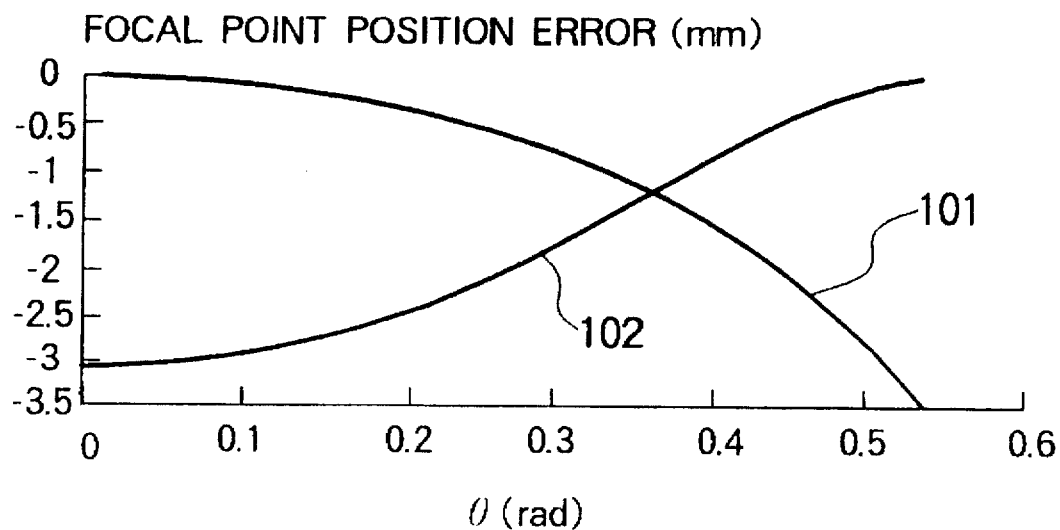
FIG. 8 is graphs showing focal point position errors and linearity errors in a laser scanner according to an embodiment of the present invention.
Figure 8B:
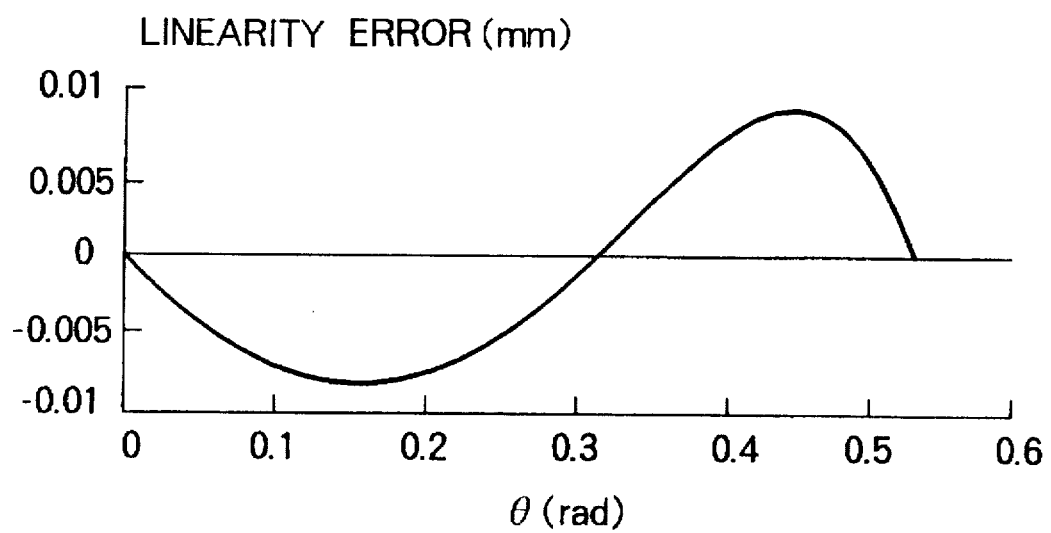

For example, when it is assumed that the distance $L_1$ from the scanning mirror 4 to the curved surface reflecting mirror 5 at the scanning center is 147 mm, the distance $L_2$ from the curved surface reflecting mirror 5 to the scanning line 6 is 153 mm, the radius $R_1$ of the reflecting surface of the curved surface reflecting mirror 5 in the major axis direction is 470 mm, the radius $R_2$ in the minor axis direction is 463 mm, and the center axis of rotation is the longitudinal radius $R_1$, the focal point position error is a curve 101 as shown in FIG. 8 (a) in the scanning direction, and a curve 102 in the direction normal to the scanning direction. The axis of abscissas indicates the angle of the direction of laser beam to the center of scanning in radian. The linearity error is as shown in FIG. 8 (b), and indicates shifting from an ideal position.

Figure 9A:
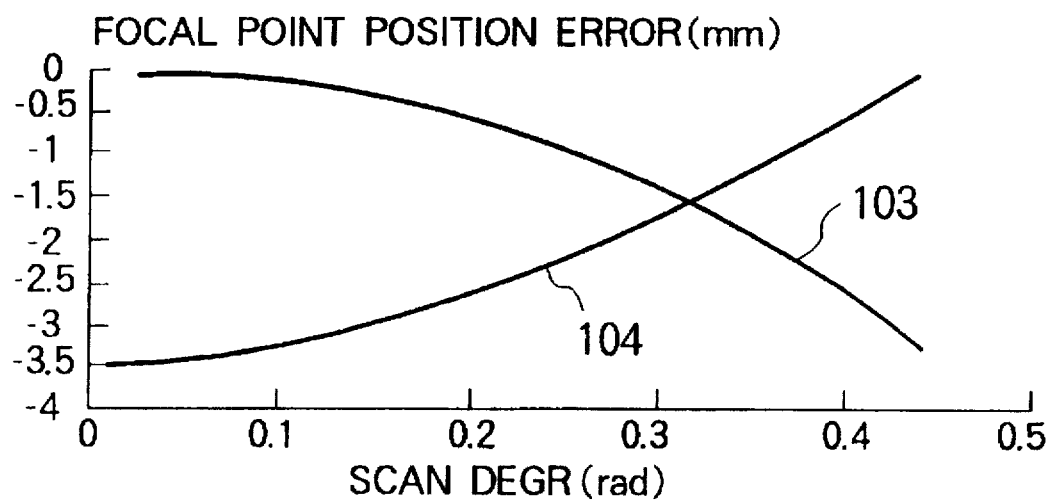
FIG. 9 is graphs showing focal point position errors and linearity errors in a laser scanner according to an embodiment of the present invention.
Figure 9B:
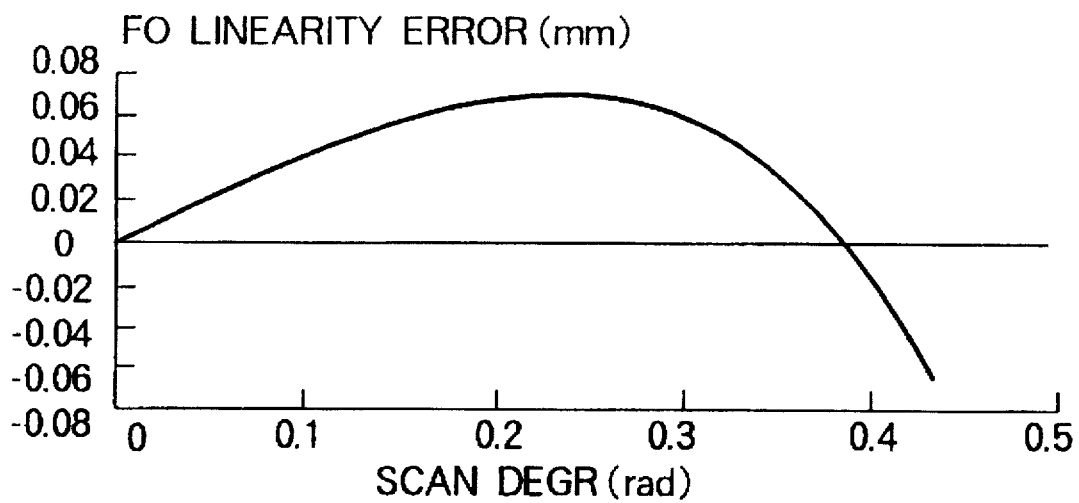

In addition, when it is assumed that the distance $L_1$ from the scanning mirror 4 to the curved surface reflecting mirror 5 at the scanning center is 175 mm, the distance $L_2$ from the curved surface reflecting mirror 5 to the scanning line 6 is 205 mm, the radius $R_1$ of the reflecting surface of the curved surface reflecting mirror 5 in the longitudinal direction is 543 mm, the radius $R_2$ in the transverse direction is 537 mm, and the center axis of rotation is the longitudinal radius $R_1$, the focal point position error is a curve 103 as shown in FIG. 9 (a) in the scanning direction, and a curve 104 in the direction normal to the scanning direction. The axis of abscissas indicates the angle of the direction of laser beam to the center of scanning in radian. The linearity error is as shown in FIG. 9 (b), and indicates shifting from an ideal position. In the above two examples, the linearity error and the focal point position error are at a level sufficient for practical use.

Figure 10A:
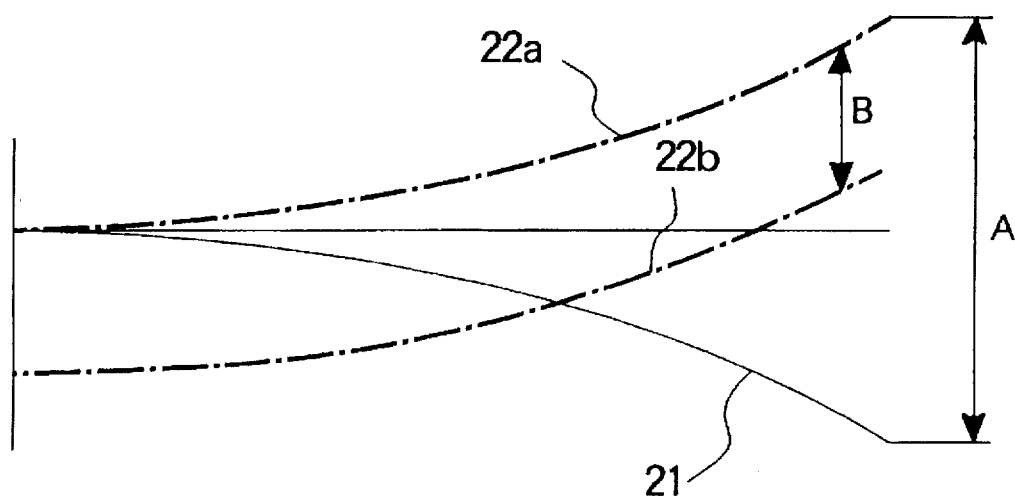
FIG. 10 is graphs for illustrating curing of the curved surface mirror for a laser scanner according to an embodiment of the present invention.
Figure 10B:
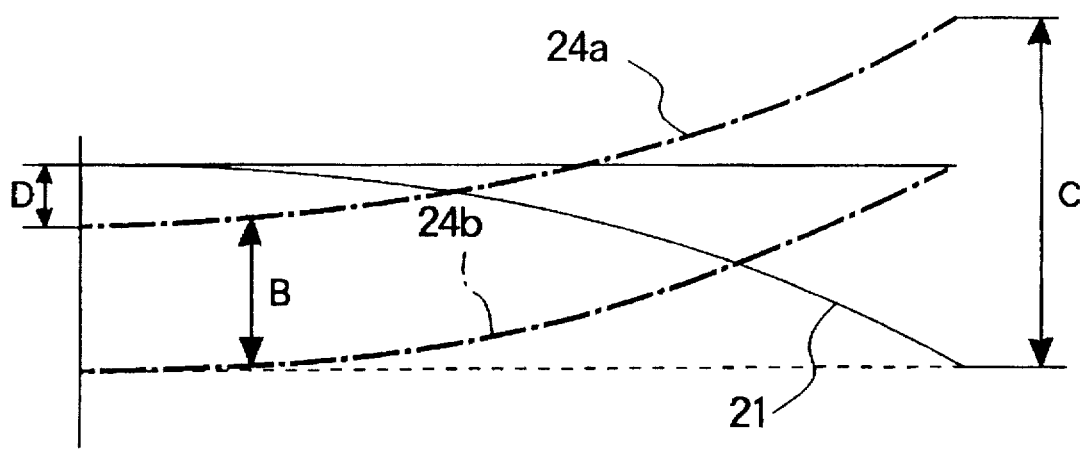

FIGS. 8 and 9 are graphs when there is no astigmatic difference in the laser diode 1. If any, as shown in FIG. 10 (a) illustrating a case of a curved surface reflecting mirror with the same curvatures in the primary and secondary scanning directions, the focal point position error varies as indicated by a curve 21 in the scanning direction, the linearity error in the vertical direction is as indicated by a curve 22a for the astigmatic difference of 0, and the focal point position error is as indicated by a curve 22b for the maximum astigmatic difference. If there is variation in the astigmatic difference, the focal point position error in the vertical direction is determined in a range indicated by B. On the other hand, FIG. 10 (b) shows the curved surface reflecting mirror with curvatures of the present invention. Because the value of D can be varied by changing the circularity when compared with FIG. 10 (a), the entire error can be made smaller than A in FIG. 8 (a) so that the scanner can have higher resolution.

Here, a case where the laser beam is incident on the curved surface reflecting mirror 5 with an angle is described with reference to FIGS. 7 and 11.

If the incident angles of the laser beam on the single surface mirror 4 are $\alpha=90°$ and $\beta=0°$, the laser beam causes a scanning curvature as indicated by a broken line 6a. Then, the scanning curvature can be suppressed by making the angle $\beta$ substantially equal to the angle $\theta$. When the angles in the direction along the chip surface and the secondary scanning direction are matched by the angle of $\beta$, the laser beam reflected from the scanning mirror fails to match for the components in the scanning direction and in the direction normal to the chip layer of the laser diode 1 so as to cause distortion in the laser beam as shown in FIG. 12. Then, the components of the laser beam reflected by the scanning mirror 4 can be substantially matched in the direction normal to the chip layer of the laser diode 1 and the scanning direction by arranging the direction along the chip layer of the laser diode 1 and the secondary scanning direction to have an angle substantially equal to $\beta$ so that the distortion of the laser beam can be reduced.

Figure 13:
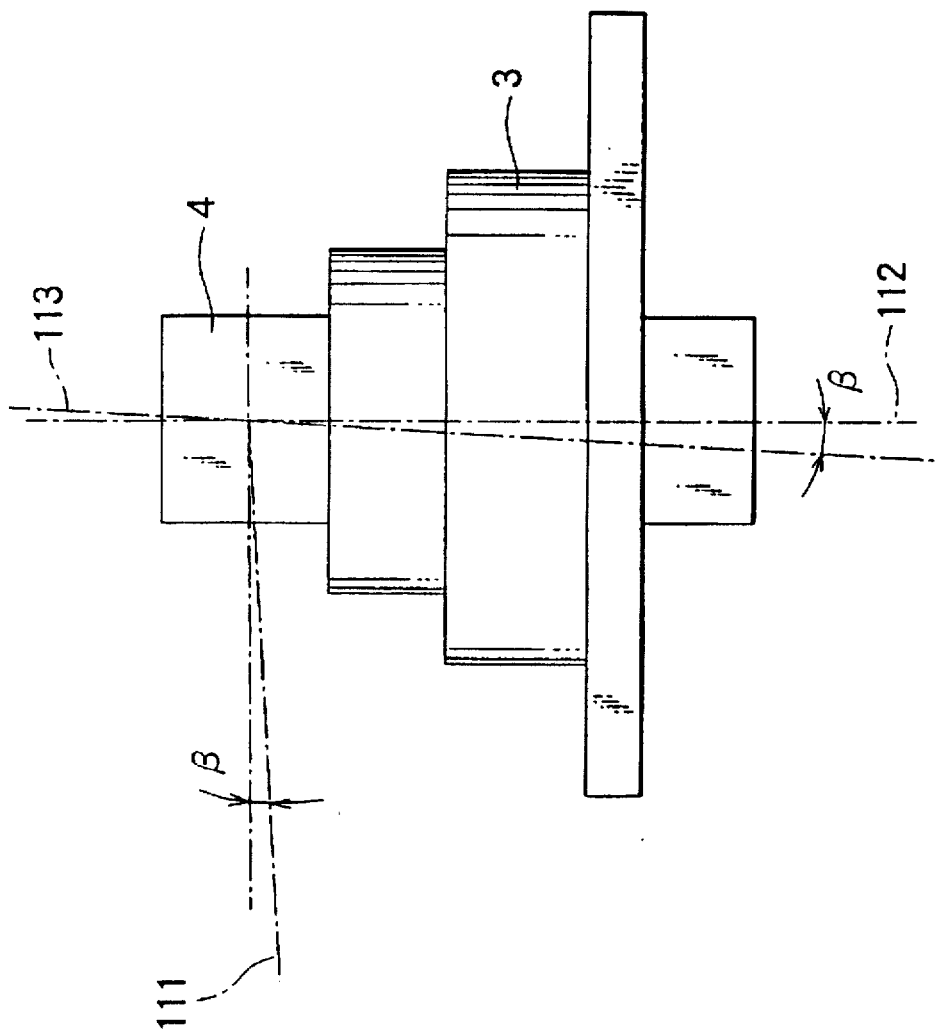
FIG. 13 is a diagram for illustrating operation of the present invention.

Namely, when the chip layer direction of the laser diode 1 emitting the laser beam incident on the scanning mirror 4 is arranged at a line 113 to the axis of rotation 112 of the scanning motor 52, as shown in FIG. 13, the direction of a component of the laser beam, which is reflected in the direction 111 at the scanning center, normal to chip layer of the laser diode 1 can be substantially matched to the scanning direction so that the distortion of the laser beam is maintained at the minimum. In the above embodiment, for $\theta=3.3°$, the scanning curvature was 2 mm at $\beta=0°$, it could be reduced to 0.1 mm or less by setting $\beta$ to $3°$.

Figure 14:
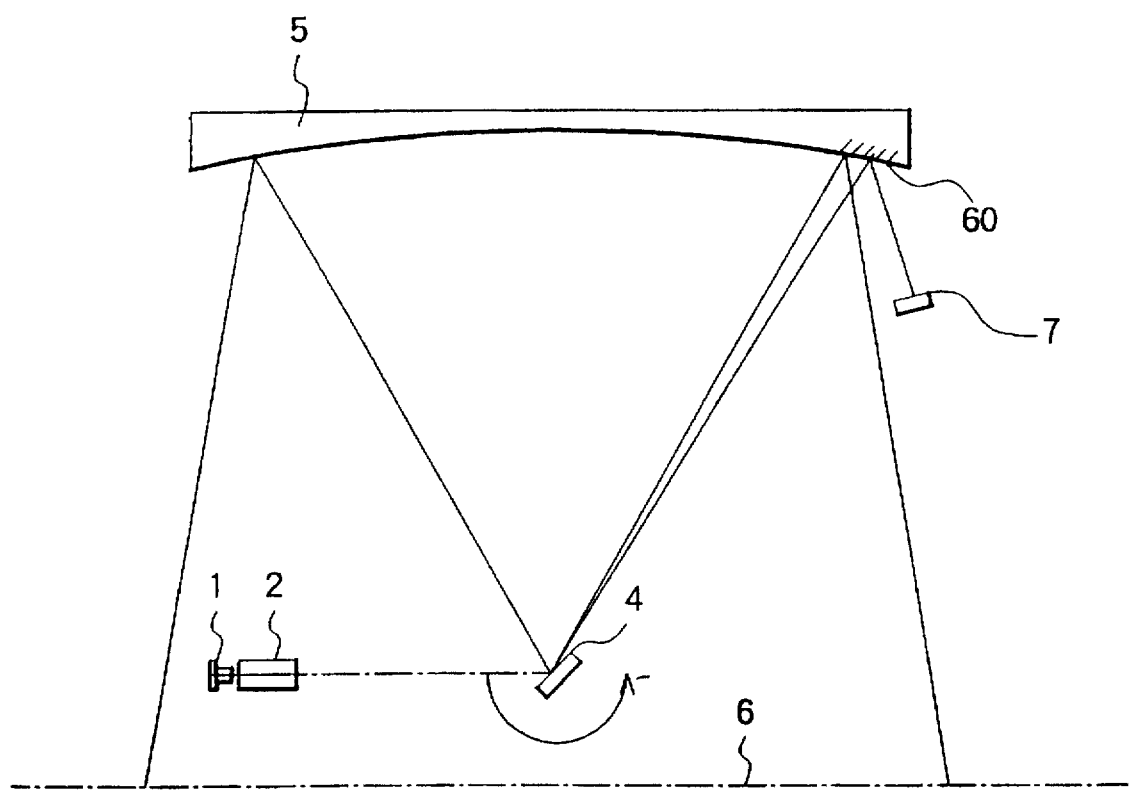
FIG. 14 is another embodiment of the present invention.

Now, another embodiment of the present invention is described with reference to FIG. 14.

The curved surface reelecting mirror 5 is precision molded with a resin material such as polycarbonate. The mirror surface is aluminum metallized and formed with a protective film thereon. A reflecting surface 60 is formed outside the effective scanning region of the curved surface reflecting mirror 5 integral thereto with a different curvature than that in the region. The reflecting surface 60 reflects the laser beam toward the light receiving element 7 to detect the reference position of the laser beam. The reflecting surface 60 has a shape focusing the laser beam on the light receiving area or its neighborhood. Its shape may be spherical or aspheric, and only needs to satisfy such function. The position of the light receiving element 7 may be freely established by changing the curved shape of the reflecting surface 60.

Accordingly, while the scanning mirror 4 is rotated at a constant speed in the direction of arrow, the laser beam projected from the laser diode 1 passes through the condenser lens 2, is turned into a convergent beam, incident on the scanning mirror 4, and reflected. The reflected laser beam is turned into the scanning beam and moved from the right to the left in the figure. The laser beam is first incident on the area 60 of the curved surface reflecting mirror 5, reflected and incident on the light receiving element 7 as a laser beam position detection element. The light receiving element 7 generates a detection signal when receiving the laser beam, which signal is sent to the CPU 42. The CPU 42 stops the laser beam once immediately after the detection of position. The laser beam is then turned on or off based on print data supplied from an external device through the interface 56. The laser beam reflected from the curved surface reflecting mirror 5 scans the recording line 6 while flashing as the scanning mirror 4 rotates to perform writing.

Now, the bonding location between the condenser lens frame 8 and the lens holder 10 is described.

The ultraviolet curing adhesives are injected through the injection port 13 to fix the condenser lens frame 8 on the lens holder 10.

When it is assumed, for example, that the distance from the laser diode 1 to the adhesive injection port 13 is $L_3$, and the distance from the condenser lens 2 to the adhesive injection port 13 is $L_4$, if a temperature change occurs, the distance between the laser diode 1 and the condenser lens 2 changed by a predetermined amount $\Delta L$ as the lens frame 8 and the lens holder 10 is fixedly adhered at the area of the adhesive injection port 13. $\Delta L$ can be found from the following formula:

$$\Delta L = (1 \times 10^{-5} \times L_3 - 2 \times 10^{-5} \times L_4)T$$
$$= (L_3 - 2 \times L_4)T \times 10^{-5}$$

From the above formula, it is possible to make the value of DL zero regardless of the temperature change T if the distance $L_3$ is established to be two times the distance $L_4$. In addition, even if the distance $L_3$ is not established to be two times the distance $L_4$, $\Delta L$ can be made small by using the same material for the lens frame 8 and the lens holder 10. That is, since $L_3>L_4$, if the coefficient of linear expansion of the material for the lens holder 10 is smaller than that of the material for the lens frame 8, $\Delta L$ can be effectively reduced. While an iron material is used for the lens holder 10, it may be a resin material with a smaller coefficient of linear expansion.

Figure 15:
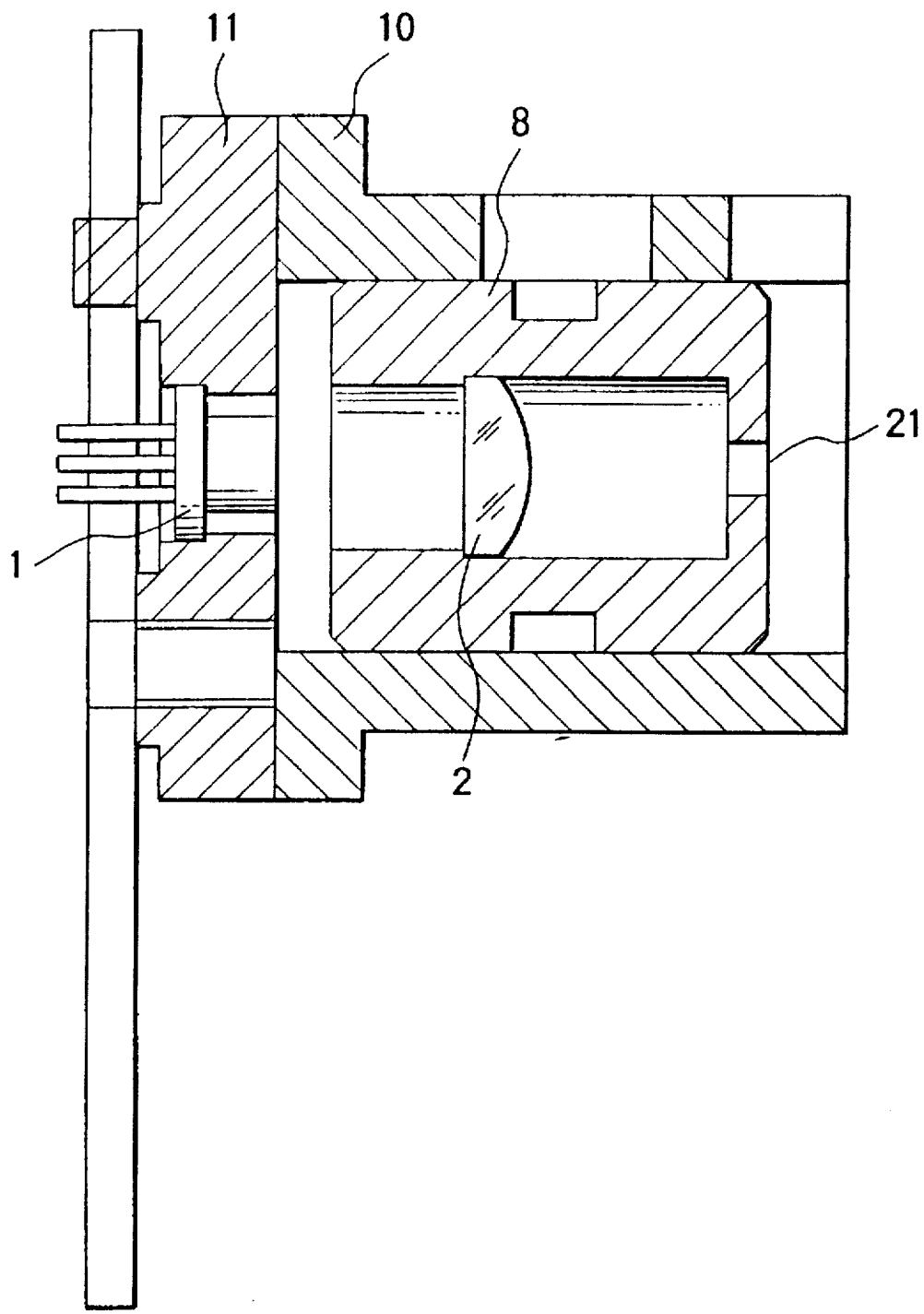
FIG. 15 is another embodiment of the present invention.
Figure 16:
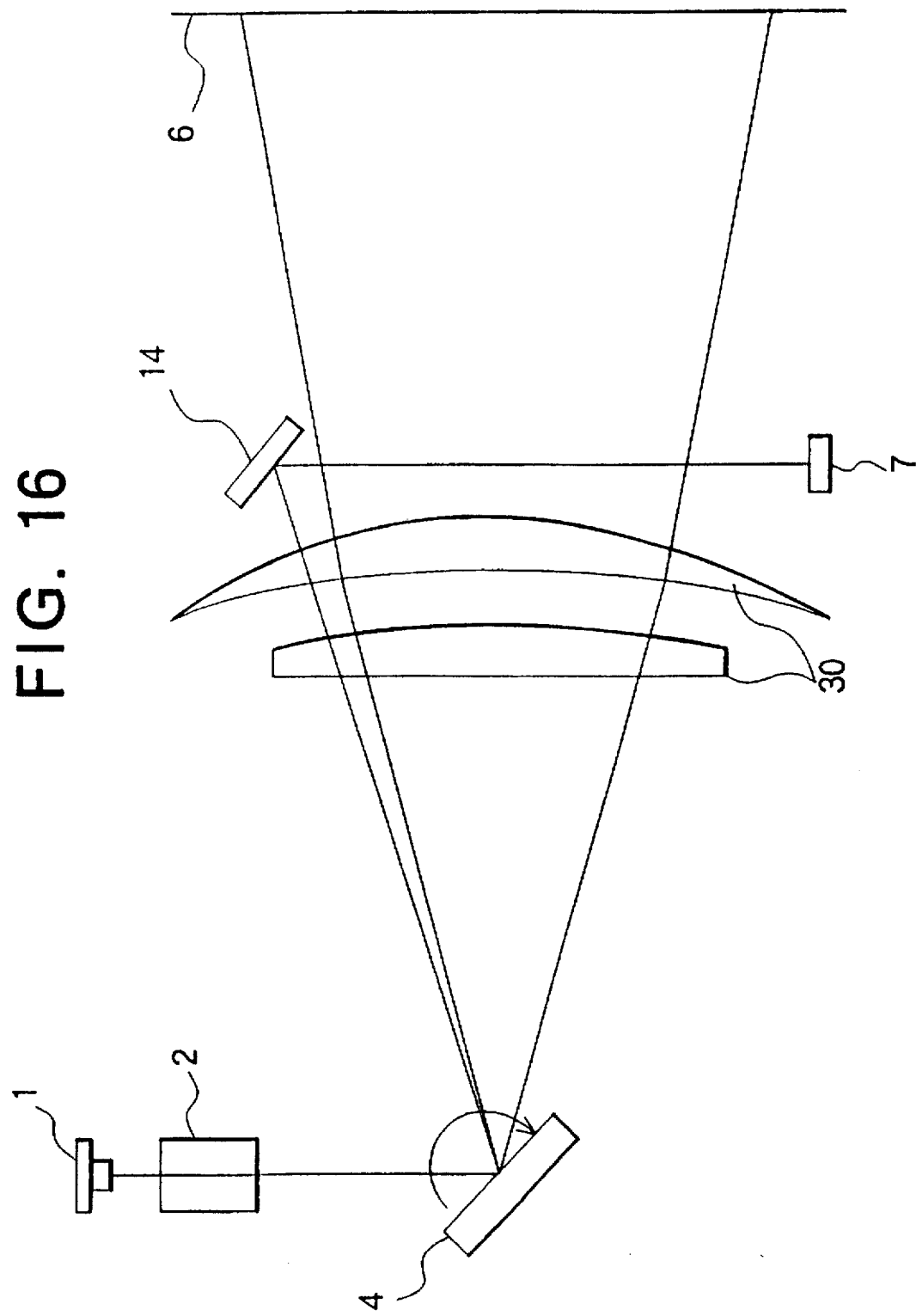
FIG. 16 is a schematic diagram showing the arrangement of a conventional laser scanner.
Figure 17:
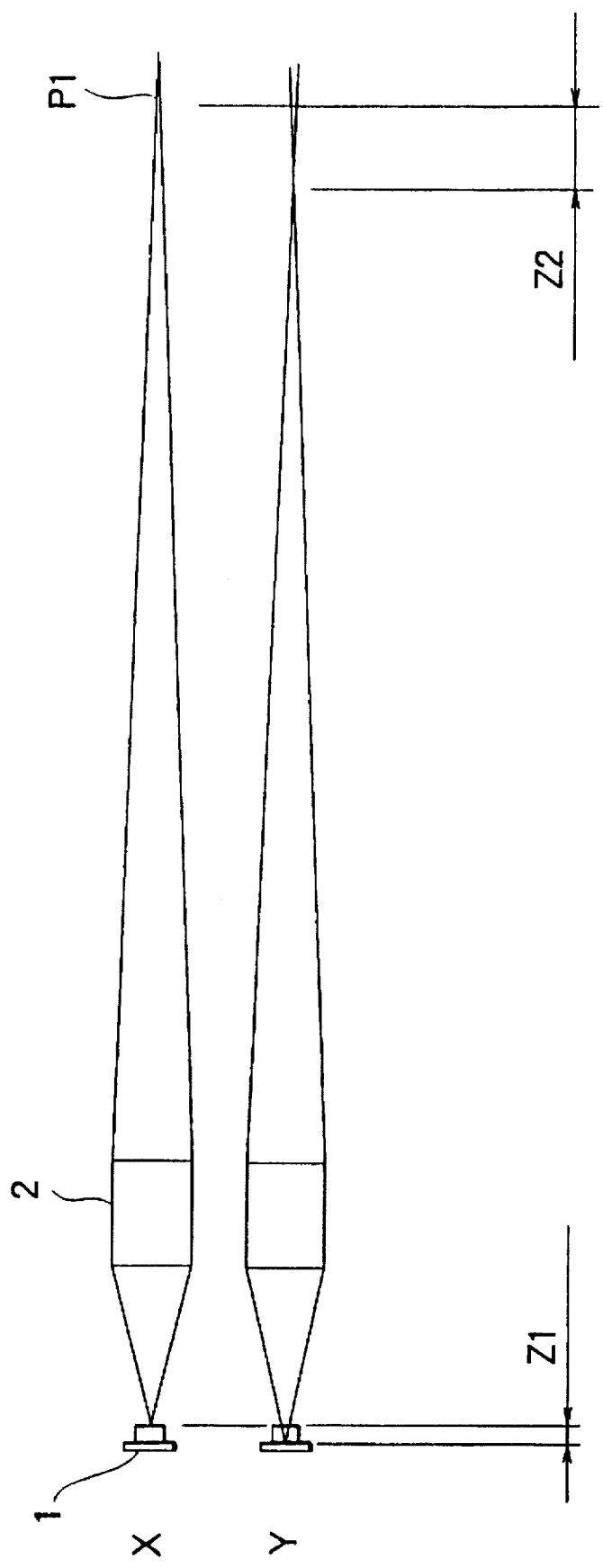
FIG. 17 is a diagram for illustrating an astigmatic difference of a laser scanner.

In addition, although the slit 20 for limiting the laser beam and regulating the beam spot shape is mounted on the front end of the lens holder 10 as a separate member, a slit 21 may be integrally formed on the condenser lens frame 8 as shown in FIG. 15.

Many widely different embodiments of the present invention may be constructed without departing from the spirit and scope of the present invention. It should be understood that the present invention is not limited to the specific embodiments described in the specification.

What is claimed is:

1. A laser scanner comprising:

a laser emitting unit composed of laser oscillating means for projecting a laser beam, and condenser lens means for condensing the laser beam projected from said laser oscillating means;

laser scanning means including a scanning mirror for moving linearly the laser beam, condensed by said condenser lens means, in a primary scanning direction thereof;

curved surface reflecting mirror means for reflecting the laser beam moved by said scanning mirror; and a photosensitive body for receiving the laser beam reflected by said curved surface reflecting mirror, wherein said curved surface reflecting mirror is circularly symmetrical in the primary scanning direction of the laser beam and elliptical in a secondary scanning direction which is perpendicular to the primary scanning direction, so that the laser beam travels at a substantially constant speed on the scanned surface of said photosensitive body, and wherein the distance, from said scanning mirror to said curved surface reflecting mirror means, is arranged to be substantially equal to the distance from said curved surface reflecting mirror means to the scanning line of the laser beam scanned on said photosensitive body, so that the incident angle of the laser beam on said scanning mirror is made substantially normal to the center of scanning in the primary scanning direction, and substantially equal to the incident angle of the laser beam onto the curved surface reflecting mirror from the direction normal to the secondary scanning direction.

2. A laser scanner according to claim 1, wherein said curved surface reflecting mirror means is molded resin.

3. A laser scanner comprising:

a laser emitting unit composed of laser oscillating means for projecting a laser beam, and condenser lens means for condensing the laser beam projected from said laser oscillating means;

laser scanning means including a scanning mirror for moving linearly the laser beam, condensed by said condenser lens means, in a primary scanning direction thereof;

curved surface reflecting mirror means for reflecting the laser beam moved by said scanning mirror; and a photosensitive body for receiving the laser beam reflected by said curved surface reflecting mirror, wherein said curved surface reflecting mirror is circularly symmetrical in the primary scanning direction of the laser beam and elliptical in a secondary scanning direction which is perpendicular to the primary scanning direction, so that the laser beam travels at a substantially constant speed on the scanned surface of said photosensitive body, and wherein said laser oscillator is constituted by a laser diode having a planar chip layer, the orientation of said chip layer being inclined at an angle substantially equal to the incident angle on the scanning mirror in the secondary scanning direction.

4. A laser scanner according to claim 3, wherein the laser beam projected from said laser diode and passing through the condenser lens which converges said laser beam is convergent.

5. A laser scanner comprising:

a laser emitting unit composed of laser oscillating means for projecting a laser beam, and condenser lens means for condensing the laser beam projected from said laser oscillating means;

laser scanning means including a scanning mirror for moving linearly the laser beam, condensed by said condenser lens means, in a primary scanning direction thereof;

curved surface reflecting mirror means for reflecting the laser beam moved by said scanning mirror; and a photosensitive body for receiving the laser beam reflected by said curved surface reflecting mirror, laser oscillating means holding means for holding said laser oscillating means;

a condenser lens frame for holding said condenser lens means;

lens holding means made of a material selected from materials with a coefficient of linear expansion larger than that of said condenser lens frame and for holding said condenser lens frame slidably in the axial direction; and an adhesive injection port formed in said lens holding means at the side not contacting the laser oscillating means holding means, wherein said curved surface reflecting mirror is circularly symmetrical in the primary scanning direction of the laser beam and elliptical in the secondary scanning direction, having another mirror portion outside the effective scanning region with a different curvature than that in the region, the laser beam travelling at a substantially constant speed on said scanned surface of said photosensitive body, wherein the position of said condenser lens is determined, said condenser lens frame is fixed on said lens holding means by injecting adhesives through said injection port, and wherein said laser oscillator is constituted by a laser diode having a planar chip layer, the orientation of said chip layer being inclined at an angle substantially equal to the incident angle on the scanning mirror in the secondary scanning direction.

6. A laser scanner according to claim 5, wherein a light-receiving element is disposed on the reflected optical path of the laser beam projected on said another mirror portion of said curved surface reflecting mirror means.

7. A laser scanner according to claim 6, wherein the laser beam, reflected on said another mirror portion of said curved surface reflecting mirror means, is focused near the light-receiving element.

8. A laser scanner according to claim 5, wherein a slit with a rectangular opening is integrally formed on the laser projecting port of the condenser lens frame.

* * * * *